(12) United States Patent
Bornowski

(10) Patent No.: US 7,149,326 B2
(45) Date of Patent: *Dec. 12, 2006

(54) METHOD AND SOFTWARE-IMPLEMENTED APPARATUS FOR DETECTING OBJECTS IN MULTI-DIMENSIONAL DATA

(75) Inventor: Arthur Steven Bornowski, Sunnyvale, TX (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 259 days.

This patent is subject to a terminal disclaimer.

(21) Appl. No.: 10/373,980

(22) Filed: Feb. 25, 2003

(65) Prior Publication Data

US 2004/0008868 A1    Jan. 15, 2004

Related U.S. Application Data

(63) Continuation of application No. 09/426,559, filed on Oct. 22, 1999, now Pat. No. 6,621,914.

(51) Int. Cl.
G06K 9/00     (2006.01)
G06K 9/62     (2006.01)
G06K 9/48     (2006.01)

(52) U.S. Cl. .................. 382/103; 382/199; 382/224

(58) Field of Classification Search ................ 382/103, 382/173, 199, 224; 356/5.01–5.03
See application file for complete search history.

(56) References Cited

U.S. PATENT DOCUMENTS

| 4,497,065 | A | * | 1/1985 | Tisdale et al. | 382/103 |
| 5,270,780 | A | * | 12/1993 | Moran et al. | 356/5.04 |
| 5,644,386 | A | * | 7/1997 | Jenkins et al. | 356/4.01 |
| 5,719,773 | A | * | 2/1998 | Choate | 701/223 |
| 5,787,201 | A | * | 7/1998 | Nelson et al. | 382/224 |
| 6,259,803 | B1 | * | 7/2001 | Wirtz et al. | 382/103 |
| 6,323,941 | B1 | * | 11/2001 | Evans et al. | 356/4.01 |
| 6,392,747 | B1 | * | 5/2002 | Allen et al. | 356/141.1 |
| 6,529,206 | B1 | * | 3/2003 | Ohki et al. | 345/619 |
| 6,621,914 | B1 | * | 9/2003 | Bornowski | 382/103 |

* cited by examiner

*Primary Examiner*—Jingge Wu
*Assistant Examiner*—Brian Le
(74) *Attorney, Agent, or Firm*—Williams, Morgan & Amerson, P.C.

(57) ABSTRACT

A method for detecting the presence of an object in multi-dimensional imagery data is disclosed. The method includes: (a) providing multi-dimensional imagery data, including an array of pixels; (b) selecting a pixel in the array; (c) applying a linear mask to the selected pixel and local pixels, including selecting pixels linearly adjacent to the selected pixel, amplifying the z coordinate of the selected pixel, summing the z coordinates of the selected linearly adjacent pixels, and comparing the amplified z coordinate to the summed z coordinates to produce value A; (d) if value A exceeds specified threshold A, then applying a confirmation mask to the selected pixel and the selected linearly adjacent pixels, including selecting one linearly adjacent pixel and comparing the z coordinate of the selected pixel to the z coordinate of the linearly adjacent pixel to produce value B; and (e) if value B exceeds specified threshold B, then designating the selected pixel as being associated with the boundary of an object.

27 Claims, 3 Drawing Sheets mask 1

|       | col 1 | col 2  | col 3 |
|-------|-------|--------|-------|
| row a | -1    | x      | x     |
| row b | x     | 2(sp)  | x     |
| row c | x     | x      | -1    | mask 2

|       | col 1 | col 2  | col 3 |
|-------|-------|--------|-------|
| row a | x     | x      | -1    |
| row b | x     | 2(sp)  | x     |
| row c | -1    | x      | x     |

FIG. 3A mask 3

|       | col 1 | col 2   | col 3 |
|-------|-------|---------|-------|
| row a | x     | x       | x     |
| row b | x     | -2(sp)  | 1     |
| row c | x     | 1       | x     | mask 4

|       | col 1 | col 2   | col 3 |
|-------|-------|---------|-------|
| row a | x     | 1       | x     |
| row b | x     | -2(sp)  | x     |
| row c | x     | 1       | x     |

FIG. 3B mask 5

|       | col 1 | col 2   | col 3 |
|-------|-------|---------|-------|
| row a | 1     | x       | x     |
| row b | x     | -1(sp)  | x     |
| row c | x     | x       | 1     | mask 6

|       | col 1 | col 2   | col 3 |
|-------|-------|---------|-------|
| row a | x     | x       | x     |
| row b | x     | -1(sp)  | x     |
| row c | x     | x       | 1     |

FIG. 3C

METHOD AND SOFTWARE-IMPLEMENTED APPARATUS FOR DETECTING OBJECTS IN MULTI-DIMENSIONAL DATA

This is a continuation of application Ser. No. 09/426,559 filed Oct. 22, 1999, now U.S. Letters Pat. No. 6,621,914, issued Sep. 16, 2003.

1. INTRODUCTION

1.1 Field of the Invention

The invention pertains to identifying objects in multi-dimensional imagery data and, more particularly, detecting an object in its surrounding environment in multi-dimensional imagery data.

2. BACKGROUND OF THE INVENTION

2.1 Acquisition of Multi-Dimensional Imagery Data

Multi-dimensional imagery data is an electronic picture, i.e., image, of a scene. Multi-dimensional data may be acquired in numerous ways. Laser Detection And Ranging ("LADAR") systems are commonly employed for this purpose.

Referring to FIG. 2, generally speaking, laser beams are transmitted from a platform 18 onto a scene, e.g., a scanned field of view. Upon encountering an object 12 (or multiple objects) and surrounding environment 14, varying degrees of the transmitted laser beams, characteristic of the particular scene or portion thereof, are reflected back to and detected by a sensor on the platform 18. The object 12 may be either airborne or, as shown in FIG. 2, on the ground 16.

The platform 18 can then process the reflected signals to obtain multi-dimensional imagery data regarding the object 12 that caused the reflection. The imagery data derived from the laser reflection can be processed to derive information about the distance between the object 12 and the platform 18, commonly referred to as "range," as well as information about a number of features of the object 18 such as its height, length, width, average height, etc. The quality and accuracy of the information about the features depends in large part on the conditions prevailing at the time the data is collected, including the orientation of the object relative to the platform (e.g., aspect and depression angles), obscurations, and pixel resolution.

LADAR data is generally acquired by scanning the field of view to generate rows and columns of discrete units of information known as "pixels." Pixels are used to generate a two-dimensional "image" of the scanned field of view and are correlated to the third dimension, range information. Data acquisition, and particularly LADAR data acquisition is well known in the art and any suitable technique may be employed. Some suitable techniques are disclosed in, e.g., U.S. Pat. Nos. 5,200,606; 5,224,109; 5,285,461; and 5,701,326, owned by the assignee.

2.1 Processing Multi-Dimensional Imagery Data

The platform 18 typically transmits many laser signals across a general area that may contain one or more objects reflecting the laser signals. It therefore is appropriate to examine the reflected data to determine if any objects 12 are present and if so, determine which particular reflecting objects 12 might be of interest. Automatic target recognition ("ATR") systems are used to identify objects 12 represented in multi-dimensional data to determine whether they are potential targets. ATR systems are often divided into four subsystems: object detection, object segmentation, feature extraction, and object identification.

Object identification involves taking object features such as the ones discussed above and establishing an identity for the object based on comparison(s) to features of known objects. The accuracy of the identification depends on several factors, including the correctness of the object features used in the comparison and the number of known objects constituting potential identifications.

Feature extraction involves selecting one or more features of object 12, such as its height, width, length, average length, etc., from the multi-dimensional imagery data representing object 12. Preceding feature extraction, object segmentation severs an object 12 from its surrounding environment 14., However, an object must first be detected within the multi-dimensional imagery data, meaning that each of the aforementioned subsystems depends upon the detection subsystem.

Object detection can be thought of as being the first sweep through the imagery data. It searches for the presence of one or more objects by interpreting the meaning of the image data. The imagery data includes pixel information having either (x, y) or (x, y, z) coordinates in multi-dimensional space. Pixel coordinates x, y represent vertical and horizontal position while the z coordinate represents the range, or depth, of a particular point or area in the scene relative to the platform 18. The term "pixel" is derived from the phrase "picture element." A picture (i.e., an image) is a depiction or representation of a scene. Each pixel in the array of pixels which combine to create a picture represent a certain amount of space in the scene. The amount of space represented by each pixel directly affects the resolution of the pixel. The greater the area represented by a pixel, the lower its resolution.

Resolution is easily understood by reference to an everyday example. For a given scene, a digital camera with a zoom lens will be able to bring a subset of the scene closer than would a digital camera without a zoom lens. In the zoomed close-up digital picture, each pixel represents less space in the scene than does each pixel in the distant digital picture. Therefore, the close-up digital picture and its pixels have greater resolution of the scene than the distant digital picture and its pixels. In this way resolution is a product of the distance between the scene and the platform 18, taking into account any magnification ability of the platform 18.

Resolution is not only a function of distance it is also a function of the number of pixels available to represent a scene. The fewer available pixels, the more area that must be represented by each pixel. The number of available pixels is sometimes referred to as "pixel density."

The relation between pixel density and resolution is easily understood by considering the difference between the same digital camera with and without a wide angle lens. A wide angle lens causes a picture to display a larger scene, i.e., more area per pixel, than does the camera without a wide angle lens. In this way, resolution is a product of pixel density, taking into account any wide angle ability of the platform 18.

Distance and pixel density have a multiplicative affect on resolution. Thus, resolution can be succinctly described as the separation, angular separation, between each pixel multiplied by the effective range from the platform 18 to the scene object 12.

Object detection is generally accomplished by identifying pixels with variances in range coordinates, relative to other pixels, exceeding predefined thresholds. Common detection methods search for object boundaries, object features, or some combination thereof. A detection operator is described in patent U.S. Pat. No. 5,424,823 (System For Identifying Flat Orthogonal Objects Using Reflected Energy Signals), owned by the assignee The operator examines a local neighborhood about a central pixel and counts the number of pixels that are within a range threshold from the central pixel. If the number of pixels exceeds a threshold, then the central pixel is turned on or identified as a detection pixel. This operation finds groups of pixels that are connected in image space and close in range space. The assumption of this operator is that the object of interest must have a large vertical section to detect. Most objects exhibit this phenomenon, but not necessarily at all orientations. Another limitation of this operation is that an unknown subset of the object may be detected. For example, the front of the object may be detected, but due to its orientation the detection may be on the left side of the target. Thus, for subsequent object segmentation to occur, a large segmentation window must be used to extract the object form the background. This not only makes the task of segmentation more difficult, it also makes the task take a longer period of time.

2.3 Problems with Prior Art Detection

A significant problem with some prior art detection methods is false detection, i.e., detection of an object in the imagery data when no object really exists. Since prior art detection methods generally search for objects by locating discontinuities in range coordinates of pixels, terrain or other naturally occurring aspects of an environment are often incorrectly determined to be objects. Complex scenes exacerbate the false detection problem.

Another problem with some prior art detection methods is failure to detect objects. Prior art detectors exhibit object aspect and pitch dependency whereby the position of an object 12 relative to platform 18 effectively hides the object from prior art detection methods.

Yet another problem with prior art detection methods is processor overusage. An ATR system must, as a practical matter, quickly establish the best possible detection with available computing resources. Some prior art systems attempting to address the aforementioned difficulties expend valuable resources, computing and otherwise.

The improved detection operator attempts to minimize the aforementioned deficiencies by determining the outer boundary of the object and then limiting the segmentation window to those pixels that lie near the boundary.

3. SUMMARY OF THE INVENTION

The present invention in one embodiment is a method for detecting the presence of an object in multi-dimensional imagery data. The method includes: (a) providing multi-dimensional imagery data, including an array of pixels; (b) selecting a pixel in the array; (c) applying a linear mask to the selected pixel and local pixels, including selecting pixels linearly adjacent to the selected pixel, amplifying the z coordinate of the selected pixel, summing the z coordinates of the selected linearly adjacent pixels, and comparing the amplified z coordinate to the summed z coordinates to produce value A; (d) if value A exceeds specified threshold A, then applying a confirmation mask to the selected pixel and the selected linearly adjacent pixels, including selecting one linearly adjacent pixel and comparing the z coordinate of the selected pixel to the z coordinate of the linearly adjacent pixel to produce value B; and (e) if value B exceeds specified threshold B, then designating the selected pixel as being associated with the boundary of an object.

4. BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

FIGS. 3A, 3B, and 3C show various linear masks for one embodiment of the invention.

5. DESCRIPTION OF ILLUSTRATIVE EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. For instance, the invention is placed in the context of a complete ATR system including data acquisition and object detection to facilitate an understanding of the invention. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

It will of course be appreciated that in the development of any actual embodiment, numerous implementation-specific decisions must be made to achieve the developers' specific goals, such as compliance with system-related and business-related constraints, which will vary from one implementation to another. Moreover, it will be appreciated that such a development effort, even if possibly complex and time-consuming, would be a routine undertaking for those of ordinary skill in the computer-programming arts having the benefit of this disclosure.

5.1 Illustrative Method for Detecting Objects

Figure 1:
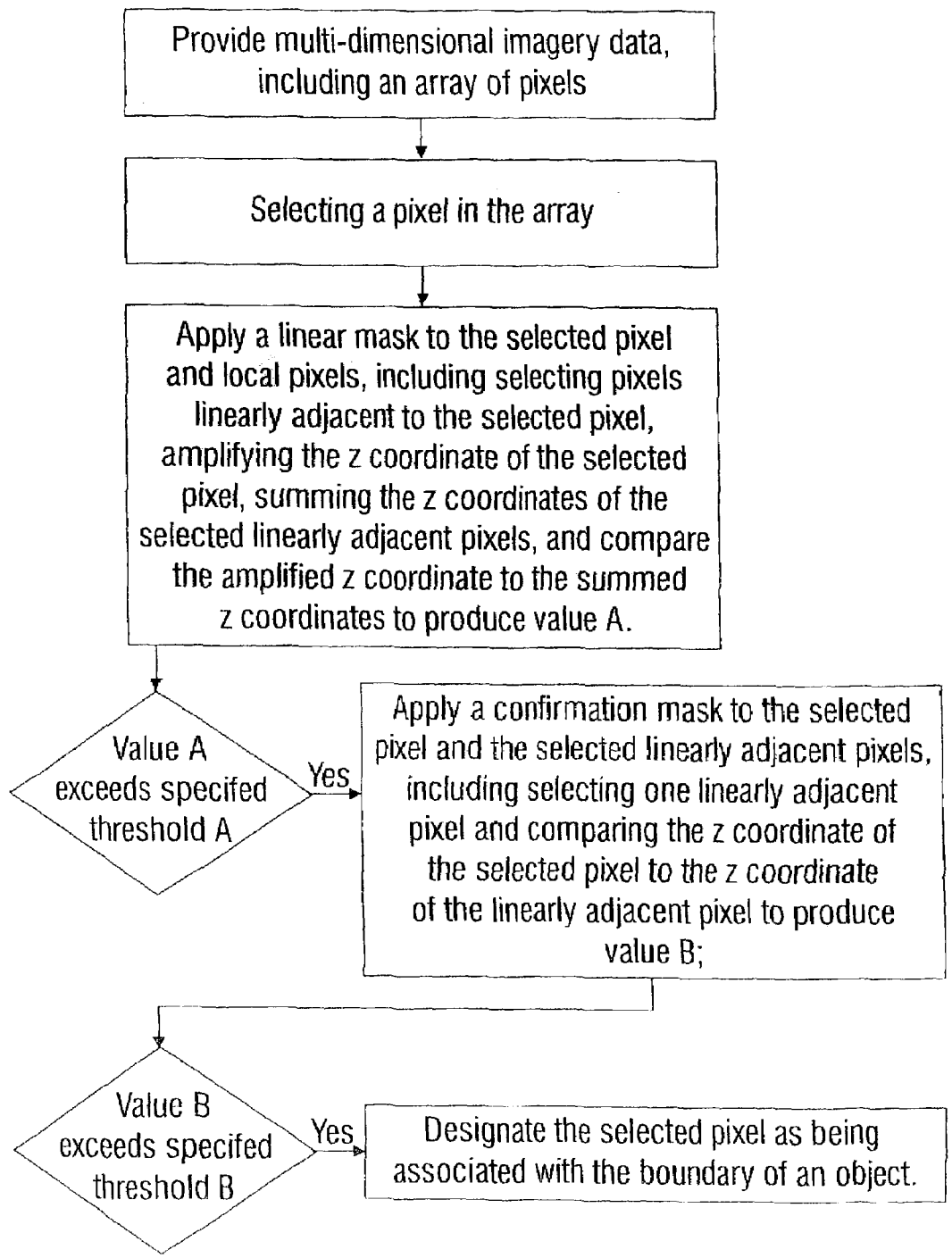
FIG. 1 illustrates a flow diagram for one embodiment of the invention.
Figure 2:
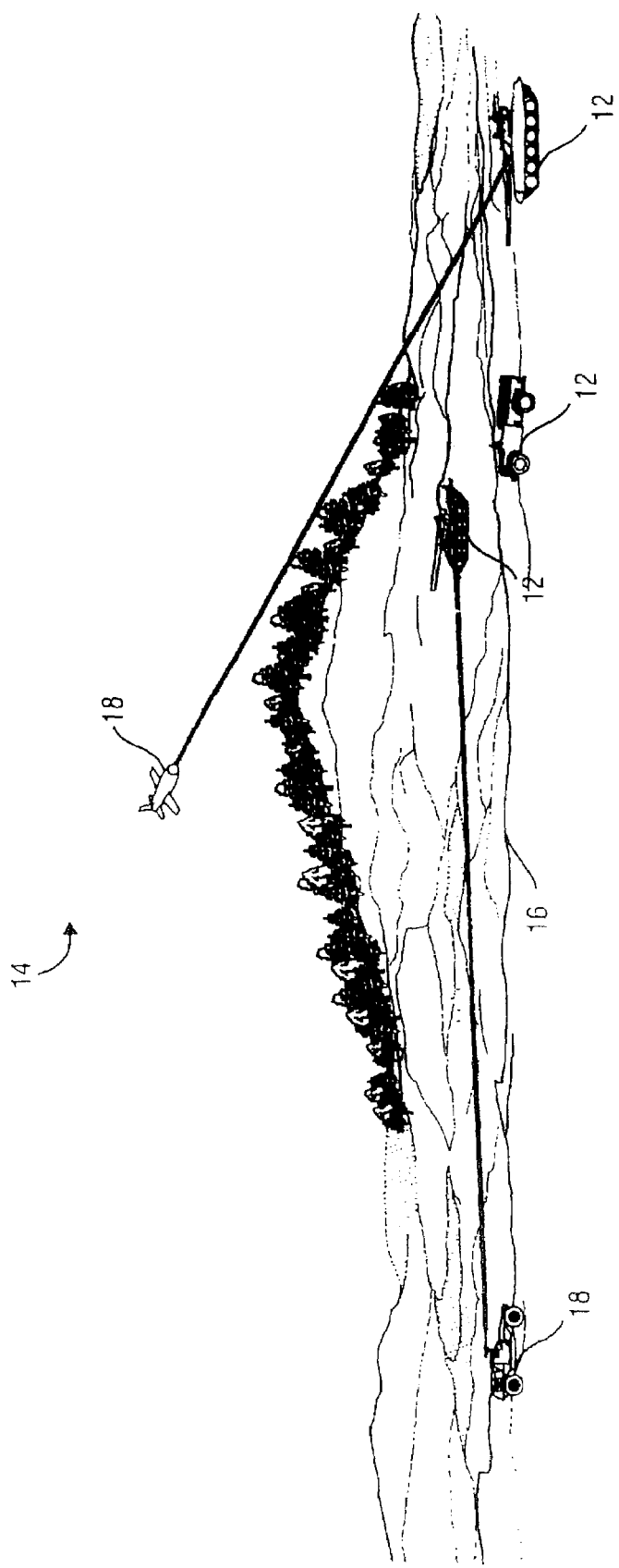
FIG. 2 illustrates the collection of multi-dimensional imagery data.

Referring to FIG. 1, an illustrative embodiment begins by providing multidimensional imagery data. Multi-dimensional imagery data is generally in the form of coordinate data, rather than in video display format. Nonetheless, in describing the invention the data will be referred to as an array of pixels, each representing some portion of the scene. Pixels are used as a visual aid regardless of the form taken by the multi-dimensional data.

Continuing with FIG. 1, a pixel in the array is selected. Selecting a pixel in the array of pixels essentially means that a particular pixel becomes the focus of analysis. It encompasses all manner of identifying a pixel for processing, whether it is random or pattern.

Next a linear mask in applied to the selected pixel. Applying a linear mask to the selected pixel and local pixels involves localizing the analysis of the selected pixel and inferring the selected pixel's status as object or surroundings from the characteristics of the local pixels relative to the characteristics of the selected pixel. The idea of a mask is really just a visual depiction of how the pixel coordinates are selected, or excluded, and analyzed. The term "linear mask" refers to a filter which filters out all pixels in the pixel array except the selected pixel ("sp") and those pixels in a localized linear path through the selected pixel. For example, FIG. 3(a) depicts four linear masks, including two diagonal filters, a horizontal filter, and a vertical filter.

When the filters in FIG. 3(a) are applied to the array of pixels in the multi-dimensional imagery data, the "x" pixels are filtered out, i.e., ignored, while the data associated with the "1" pixels is analyzed. The dimensions of the filter are unlimited, though localization of a 3×3 pixel area centered around the selected pixel is generally a suitable compromise between processor consumption and useful information. Analyzing pixel data using a filter larger than 3×3 may deliver increased detection performance, but at the risk of valuable processor time. Filters smaller than 3×3 fail to yield enough useful information.

The reason for the linear analysis is to cull out selected pixels that appear to be part of terrain or other natural surroundings, as determined by the existence of specified slope in the linear pixel group. A fixed or variable threshold value is used to differentiate between object and surroundings. A variable threshold may be based, for example, on a necessary adjustment for the detected pitch or aspect angle of the pixel coordinate data. In the present embodiment, the existence of slope is determined by the set of linear filters expressed in FIG. 3(b).

The linear masks in FIG. 3(b) are applied to the z coordinate, i.e. range, data for each of the three linear pixels. Referring to mask 1, column 1, row a (1a) and column 3, row c (3c) are linearly adjacent to the selected pixel at row b, column 2 (b2). The linear masks in FIG. 3(b) multiply, i.e., amplify, the z coordinate value for the selected pixel by a factor of two while the sign of the linearly adjacent pixels is reversed relative to the selected pixel, or vice versa. The reason for the factor of two and the sign reversal is the method of analysis. In the illustrative embodiment, the analysis method is a simple summation of the masked pixels. With respect to mask 1, the result is expressed in Equation 1, wherein b2 (row b, column 2) is the selected pixel.

$$\text{Value } A = (2*b2) - a1 - c3 \qquad \text{Equation 1}$$

Application of the linear mask produces Value A. A specified threshold value is compared to value A to determine whether the selected pixel is potentially part of an object. A threshold of 1.65 meters is effective, though the threshold may be any value, including a variable. If Value A fails to exceed the threshold value, then the selected pixel is rejected as background surroundings. Equation 1 simplistically detects the selected pixel as background surroundings (with respect to mask 1) if Value A fails to exceed a specified threshold. For example, Value A equals zero when a1, b2, and c3 range coordinates exhibit a uniform slope commonly exhibited by rolling terrain. An example of uniform slope is a1=5, b2=3, c3=1. Therefore, Value A=(2*3)−5−1, or Value A=0.

Masks 2–4 in FIG. 3(b) are applied to the multi-dimensional imagery data in a similar fashion, respectively yielding Value B, Value C and Value D. In turn, these values are compared to fixed or variable thresholds to infer the status of the selected pixel as object or surroundings.

When a resulting mask value for any one linear mask exceeds its comparative threshold it means that the selected pixel might be an object due to range discrepancies relative to adjacent pixels. In this case, a confirmation mask is applied along the linear path which resulted in the first threshold-breaking value. The purpose of the confirmation mask is to confirm or deny the status of the selected pixel as part of an object. In one embodiment, the confirmation mask determines the status of the selected pixel according to whether the magnitude of the range discrepancy, i.e., edge, is sufficiently large to warrant classifying the selected pixel as part of an object. Referring to FIG. 3(c), assuming mask 1 in FIG. 3(b) yields Value A in excess of the specified threshold value, mask 5 and/or mask 6 is applied to the selected pixel.

Masks 5 and 6 respectively yield Value E and Value F. Value E is expressed in Equation 2.

$$\text{Value } E = a1 - b2 \qquad \text{Equation 2}$$

Value E expresses the magnitude of the range discontinuity between adjacent pixels b2 and a1, where b2 is the selected pixel. Value F similarly expresses the magnitude or range discontinuity between selected pixel b2 and pixel co. If the result of either confirmation mask (Value E or Value F) exceeds a specified threshold value, the selected pixel is classified as part of an object and further processing of the selected pixel is aborted as unnecessary. A threshold of 1.95 meters is effective, though the threshold may be any value, including a variable.

The localized method of (1) rejecting relatively homogeneously sloped pixels and then (2) analyzing discontinuity magnitude if the nonhomogeneous slope exceeds a specified threshold, continues with each pixel in the multi-dimensional data. The border pixels of the multi-dimensional image are not selected in order to maintain a 3×3 localized pixel analysis. The end result is one or more chains of pixels classified as detected object boundaries. This improved detection operator identifies a significant portion of the upper boundary of objects while it rejects relatively homogeneous sloping terrain.

The improved object detector operates better than prior art detectors on complex terrain. The previous detection operator generates false detections on highly sloped, e.g., vertically sloped, regions. The prior detection operator began to fail at higher pitch, i.e., depression angle, due to the limitation that as the pitch angle increases the number of pixels on a vertical surface decreases. Also, as alluded to earlier, objects may not exhibit vertical surfaces at certain aspects. The improved operator does not suffer from these deficiencies. There are no pitch or object orientation dependencies. Furthermore the segmentation window can now be better localized about the object.

Those skilled in the art will also recognize that the exact procedure implemented may be influenced by design parameters. Two or more linear filters in FIGS. 3A to 3C could be consolidated into a single filter. Certainly the image data could be processed more quickly by consolidation when no object exists in the data, but if a portion of an object is in the data, then for purposes of accuracy in detection the pixels will have to be analyzed to further isolate the potential detection. In order to further isolate a potential object pixel, the local pixels may have to be analyzed one linear path at a time. Further, the filters may take any shape and are not limited to being linear. Such variations in the detection method are well within the scope of the invention.

6. PROGRAM STORAGE DEVICE

It will be apparent to those of ordinary skill having the benefit of this disclosure that any of the foregoing variations may be implemented by programming one or more suitable general-purpose processors in a LADAR detection system. (A common approach to implementation is likely to take the form of upgrading the software in an existing LADAR detection system.). The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It can therefore be seen that the particular embodiments disclosed above are illustrative only as the invention may be modified and practiced in different but equivalent manners apparent to those skilled in the art having the benefit of the teachings herein. Furthermore, no limitations are intended to the details of construction or design herein shown other than as described in the claims below. It is therefore evident that the particular embodiments disclosed above may be altered or modified and all such variations are considered within the scope and spirit of the invention. For instance, some embodiments may apply functions rather than simple addition and subtraction to selected pixels and adjacent or local pixels even though no such particular embodiment is illustrated in the drawings. Accordingly, the protection sought herein is as set forth in the claims below.

What is claimed is:

1. A method of detecting an object in multi-dimensional imagery data comprising:
   (a) providing multi-dimensional imagery data, including an array of pixels;
   (b) locating a pixel in the array having a slope discontinuity relative to surrounding pixels in excess of a specified threshold A; and
   (c) if the range of the located pixel exceeds the range of one or more of the surrounding pixels in excess of a specified threshold B, designating the located pixel as being associated with the boundary of a detected object.

2. The method of claim 1, wherein the surrounding pixels comprise two linearly adjacent pixels.

3. The method of claim 1, wherein the slope discontinuity is determined by selecting a pixel and applying a linear mask to the selected pixel.

4. The method of claim 3, wherein the linear mask comprises a three by three array centered about and including the selected pixel.

5. The method of claim 1, wherein the slope discontinuity is determined by an equation having as variables one or more detected conditions prevailing during the collection of the multi-dimensional data.

6. The method of claim 1, wherein the multi-dimensional data includes LADAR data.

7. The method of claim 1, wherein threshold A is 1.65 meters.

8. The method of claim 1, wherein threshold B is 1.95 meters.

9. The method of claim 1, wherein threshold A comprises a variable.

10. A program storage medium encoded with instructions that, when executed by a computer, perform a method for detecting an object in multi-dimensional imagery data comprising:
    (a) providing multi-dimensional imagery data, including an array of pixels;
    (b) selecting a pixel in the array;
    (c) applying a linear mask to the selected pixel and local pixels, including selecting pixels linearly adjacent to the selected pixel, amplifying the z coordinate of the selected pixel, summing the z coordinates of the selected linearly adjacent pixels, and comparing the amplified z coordinate to the summed z coordinates to produce value A;
    (d) if value A exceeds specified threshold A, then applying a confirmation mask to the selected pixel and the selected linearly adjacent pixels, including selecting one linearly adjacent pixel and comparing the z coordinate of the selected pixel to the z coordinate of the linearly adjacent pixel to produce value B; and
    (e) if value B exceeds specified threshold b, then designating the selected pixel as being associated with the boundary of an object.

11. The program storage medium of claim 10, wherein the multi-dimensional data includes LADAR data.

12. The program storage medium of claim 10, wherein the linear mask comprises a three by three array centered about and including the selected pixel.

13. The program storage medium of claim 10, wherein threshold A is 1.65 meters.

14. The program storage medium of claim 10, wherein amplifying the z coordinate of the selected pixel amplifies the selected pixel by a factor of two.

15. The program storage medium of claim 10, wherein threshold B is 1.95 meters.

16. The program storage medium of claim 10, wherein threshold A comprises a variable.

17. A program storage medium encoded with instructions that, when executed by a computer, perform a method of detecting an object in multi-dimensional imagery data comprising:
    (a) providing multi-dimensional imagery data, including an array of pixels;
    (b) locating a pixel in the array having a slope discontinuity relative to surrounding pixels in excess of a specified threshold A; and
    (c) if the range of the located pixel exceeds the range of one or more of the surrounding pixels in excess of a specified threshold B, designating the located pixel as being associated with the boundary of a detected object.

18. The program storage medium of claim 17, wherein the surrounding pixels comprise two linearly adjacent pixels.

19. The program storage medium of claim 17, wherein the slope discontinuity is determined by selecting a pixel and applying a linear mask to the selected pixel.

20. The program storage medium of claim 19, wherein applying a linear mask includes amplifying the z coordinate of the selected pixel summing the z coordinates of the selected linearly adjacent pixels, and comparing the amplified z coordinate to the summed z coordinates.

21. The program storage medium of claim 19, wherein the linear mask comprises a three by three array centered about and including the selected pixel.

22. The program storage medium of claim 20, wherein amplifying the z coordinate of the selected pixel amplifies the selected pixel by a factor of two.

23. The program storage medium of claim 17, wherein the slope discontinuity is determined by an equation having as variables one or more detected conditions prevailing during the collection of the multi-dimensional data.

24. The program storage medium of claim 17, wherein the multi-dimensional data includes LADAR data.

25. The program storage medium of claim 17, wherein threshold A is 1.65 meters.

26. The program storage medium of claim 17, wherein threshold B is 1.95 meters.

27. The program storage medium of claim 17, wherein threshold A comprises a variable.

* * * * *